US012804278B2

(12) United States Patent
Moroni et al.

(10) Patent No.: US 12,804,278 B2
(45) Date of Patent: Nov. 17, 2026

(54) MULTIPLE AMPLIFIER SENSING CHARGE-COUPLED DEVICE

(71) Applicant: FERMI RESEARCH ALLIANCE, LLC, Batavia, IL (US)

(72) Inventors: Guillermo Fernandez Moroni, Geneva, IL (US); Javier S. Tiffenberg, Chicago, IL (US); Juan Estrada, Geneva, IL (US); Stephen E. Holland, Hercules, CA (US)

(73) Assignees: FERMI FORWARD DISCOVERY GROUP, LLC, Chicago, IL (US); THE REGENTS OF THE UNIVERSITY OF CALIFORNIA, Oakland, CA (US)

(*) Notice: Subject to any disclaimer, the term of this patent is extended or adjusted under 35 U.S.C. 154(b) by 197 days.

(21) Appl. No.: 18/763,228

(22) Filed: Jul. 3, 2024

(65) Prior Publication Data

US 2025/0168525 A1 May 22, 2025

Related U.S. Application Data

(60) Provisional application No. 63/511,766, filed on Jul. 3, 2023.

(51) Int. Cl.

*H04N 25/626* (2023.01)
*H04N 25/713* (2023.01)
*H04N 25/75* (2023.01)

(52) U.S. Cl.

CPC ......... *H04N 25/626* (2023.01); *H04N 25/713* (2023.01); *H04N 25/75* (2023.01)

(58) Field of Classification Search

CPC ..... H04N 25/626; H04N 25/713; H04N 25/75
See application file for complete search history.

(56) References Cited

U.S. PATENT DOCUMENTS

| | | | | | |
|---|---|---|---|---|---|
| 4,272,693 | A * | 6/1981 | Meusburger | G11C 19/285 257/236 |
| 6,100,552 | A * | 8/2000 | Ingram | H10D 44/466 257/241 |
| 6,392,260 | B1 * | 5/2002 | Farrier | H10F 39/153 257/222 |
| 2006/0238635 | A1 * | 10/2006 | Atlas | H04N 25/72 348/311 |
| 2014/0362268 | A1 * | 12/2014 | Etoh | H04N 25/771 348/306 |

FOREIGN PATENT DOCUMENTS

| | | | | |
|---|---|---|---|---|
| JP | H06189201 | A * | 7/1994 | H04N 25/00 |

* cited by examiner

*Primary Examiner* — Nhan T Tran
(74) *Attorney, Agent, or Firm* — LOZA & LOZA, LLP; Kevin L. Soules

(57) ABSTRACT

Methods and systems for readout of charged couple devices include architecture for the output stage of a sensor such as a charge-coupled device. The architecture makes use of multiple serial amplifiers configured as a register, to reduce the noise of the pixel measurement without increasing the readout time of the sensor by parallel multiple readouts of the pixel information.

20 Claims, 11 Drawing Sheets

MULTIPLE AMPLIFIER SENSING CHARGE-COUPLED DEVICE

CROSS REFERENCE TO RELATED PATENT APPLICATIONS

This patent application claims the priority and benefit under 35 U.S.C. § 119(e) of U.S. Provisional Patent Application Ser. No. 63/511,766 filed Jul. 3, 2023, entitled "MULTIPLE AMPLIFIER SENSING CHARGE-COUPLED DEVICE." U.S. Provisional Patent Application Ser. No. 63/511,766 is herein incorporated by reference in its entirety.

This invention described in this patent application was made with government support under Contract No. DE-AC02-05CH11231 awarded by the U.S. Department of Energy. The government has certain rights in the invention.

STATEMENT OF GOVERNMENT RIGHTS

The invention described in this patent application was made with Government support under the Fermi Research Alliance, LLC, Contract Number DE-AC02-07CH11359 awarded by the U.S. Department of Energy. The Government has certain rights in the invention.

TECHNICAL FIELD

Embodiments are related to the field of imaging. Embodiments are also related to detectors. Embodiments are further related to the field of charge-coupled (CCD) devices. Embodiments are further related to CCD readout architecture. Embodiments are also related to systems and methods for measuring output of a detector.

BACKGROUND

Charge Couple Devices (CCDs) are image sensors of great importance, used in scientific instruments and commercial products. Generally speaking, a CCD is an integrated circuit that includes a matrix of coupled capacitors. The pixels in the CCD are configured to allow incoming photons to be converted into electrical charges. The integrated circuit is further configured to read out those electrical charges. The electric charge is proportional to the intensity of the incident photons.

The readout of a traditional CCD operates by transferring the charge from one capacitor to the next. The last capacitor feeds its charge into an amplifier which results in an associated voltage. Each of the capacitors in the matrix are read out in this manner resulting in a sequence of voltages which can be processed into a signal representative of the collected photons (e.g., an image).

The technology is instrumental in the creation of digital images with very high quality, particularly as compared to other pixelated detectors. However, the sequential readout creates a bottleneck. One of the main limitations of such sensors is the slow readout speed.

Indeed, a common strategy for reducing readout noise is realized by spending extra readout time on each pixel. This can improve image quality at the expense of readout speed. This fundamental tradeoff between readout speed and image quality remains a limiting factor for CCD technology.

As such, there is a need in the art to improve readout speed for CCDs without sacrificing image quality, as disclosed in the embodiments provided herein.

SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the disclosed embodiments to provide a method, system, and apparatus for image detection.

It is an aspect of the disclosed embodiments to provide methods and systems for improving detection with charged-coupled devices.

It is an aspect of the disclosed embodiments to provide methods and systems for improving readout efficiency of charge-coupled devices and other such detectors.

Aspects of the disclosed embodiments will now be described in further detail. In an embodiment, a system comprises a front end, and a plurality of readout stages wherein each of the plurality of readout stages are connected creating a serial readout register. In an embodiment, the plurality of readout stages further comprises: a first readout stage comprising a plurality of gates configured to provide a three-clock sequence, a sensing node, and a PS gate configured to remove charge from the sensing node. In an embodiment, the plurality of readout stages further comprises at least one middle readout stage. In an embodiment, the plurality of readout stages further comprises a final readout stage comprising a dump gate and a voltage drain to remove charge from a channel after measurement. In an embodiment, each of the plurality of readout stages is configured to readout charge information. In an embodiment, the plurality of readout stages comprises at least eight readout stages. In an embodiment, the system further comprises a wafer of pixels, wherein each of the pixels is connected to the front end. In an embodiment, the system further comprises at least one readout stage not connected to the plurality of readout stages, wherein the at least one readout stage is configured to provide a differential output. In an embodiment, the final pixel value is determined according to a measurement value from each of the plurality of readout stages.

In another embodiment, a readout method comprises receiving at least one photon on a detector, measuring a charge packet in a first of a plurality of readout stages, transferring the charge packet to a sequential readout stage among the plurality of readout stages, and determining a pixel value associated with the charge packet. In an embodiment of the method, the plurality of readout stages further comprises a first readout stage comprising: a plurality of gates configured to provide a three-clock sequence, a sensing node, and a PS gate configured to remove charge from the sensing node; at least one middle readout stage; and a final readout stage comprising: a dump gate and a voltage drain to remove charge from a channel after measurement. In an embodiment of the method, the plurality of readout stages comprises at least eight readout stages. In an embodiment, the method further comprises connecting each pixel on a wafer of pixels, to a front end associated with the plurality of readout stages. In an embodiment, the method further comprises providing a differential output with at least one readout stage not connected to the plurality of readout stages. In an embodiment the method further comprises, determining the final pixel value according to a measurement value from each of the plurality of readout stages.

In another embodiment a readout system comprises a plurality of readout stages comprising a first readout stage comprising: a plurality of gates configured to provide a three-clock sequence, a sensing node, and a PS gate configured to remove charge from the sensing node; at least one middle readout stage; and a final readout stage comprising: a dump gate and a voltage drain to remove charge from a channel after measurement. In an embodiment of the readout system, each of the plurality of readout stages is configured to readout charge information from a charge-coupled device. In an embodiment the readout system further comprises a wafer of pixels, connected to a front end associated with the plurality of readout stages. In an embodiment, the readout system further comprises at least one readout stage not connected to the plurality of readout stages, wherein the at least one readout stage is configured to provide a differential output. In an embodiment of the readout system, the final pixel value is determined according to a measurement value from each of the plurality of readout stages.

BRIEF DESCRIPTION OF THE DRAWINGS

The accompanying figures, in which like reference numerals refer to identical or functionally similar elements throughout the separate views and which are incorporated in and form a part of the specification, further illustrate the embodiments and, together with the detailed description, serve to explain the embodiments disclosed herein.

DETAILED DESCRIPTION

Figure 1A:
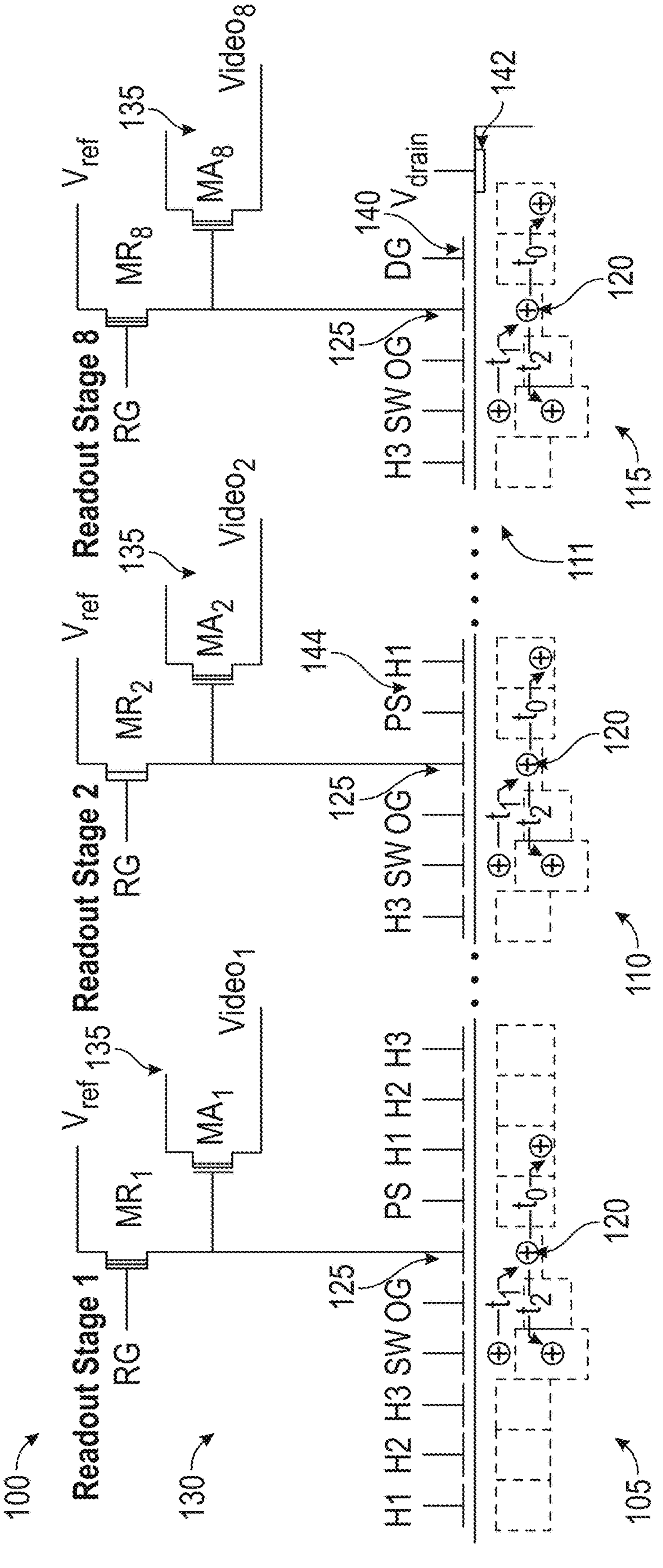
FIG. 1A depicts a diagram of a system for collecting data from a charge-coupled device, in accordance with the disclosed embodiments.

The particular values and configurations discussed in the following non-limiting examples can be varied, and are cited merely to illustrate one or more embodiments and are not intended to limit the scope thereof.

Example embodiments will now be described more fully hereinafter with reference to the accompanying drawings, in which illustrative embodiments are shown. The embodiments disclosed herein can be embodied in many different forms and should not be construed as limited to the embodiments set forth herein; rather, these embodiments are provided so that this disclosure will be thorough and complete, and will fully convey the scope of the embodiments to those skilled in the art. Like numbers refer to like elements throughout.

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. In addition, the term "based on" may be understood as not necessarily intended to convey an exclusive set of factors and may, instead, allow for existence of additional factors not necessarily expressly described, again, depending at least in part on context.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Some or all aspects of any embodiment disclosed herein may be incorporated with other embodiments without departing from the scope disclosed herein.

The embodiments disclosed herein are directed to systems, methods, and design architecture for output stages of sensors, such as a charge-coupled devices. The embodiments make use of multiple amplifiers to reduce the noise of pixel measurement without increasing the readout time of the sensor by employing in parallel, multiple readouts of the pixel information.

The embodiments take advantage of multiple non-destructive readout sensing stages connected to a common channel. The charge packets from each pixel are transferred sequentially (one after the other) through a serial register while being measured by two or more non-destructive sensing stages. This allows the charge packet to be measured at each sensing stage in the serial register.

FIG. 1A illustrates an exemplary system 100 comprising 8 inline readout stages, first readout stage 105, second readout stage 110, and eighth readout stage 115. Readout stages three through seven are illustrated by ellipses 111 and are identical in structure to that of readout stage 110. The collective inline readout stages can be configured in a front end 130 of a CCD or other such device.

Each of the inline readout stages has its own amplifier 135 (MA) with the gate connected to the sensing node 125. The amplifiers 135 provide signal amplification and current capacity for the next stage of the readout system 100. The gates between the output stages provide the means to move the charge form one amplifier to the next one. The number of gates between the amplifiers can be selected according to design considerations, and the number of gates illustrated in FIG. 1A is meant to be exemplary.

Figure 1B:
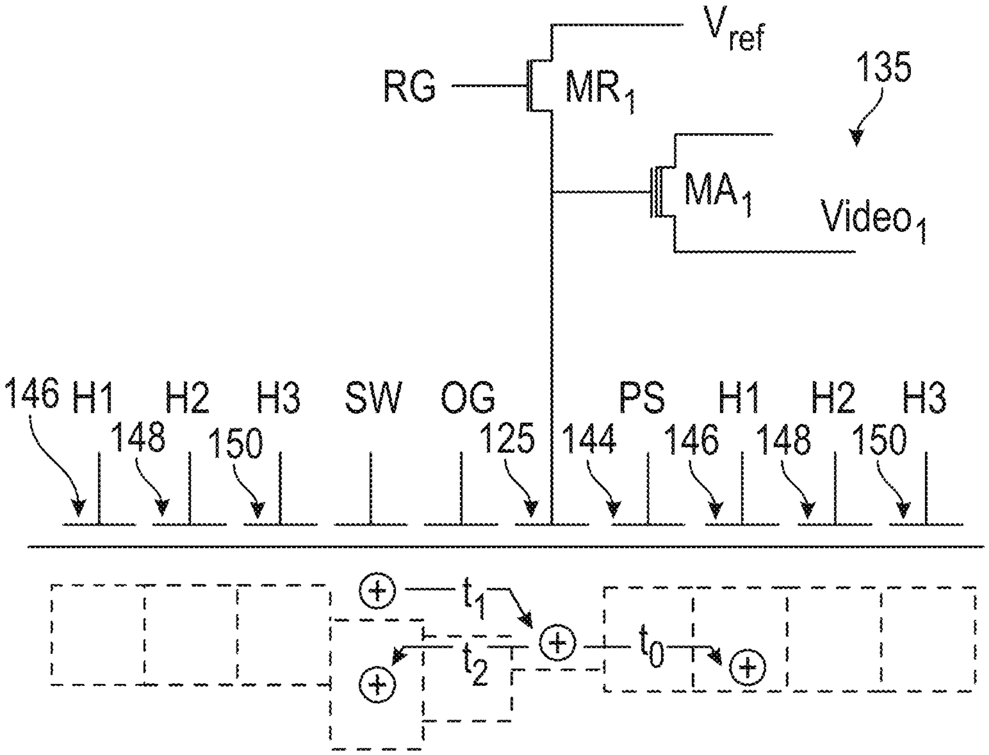
FIG. 1B depicts aspects of an exemplary first readout stage associated with a system for collecting data from a charge-coupled device, in accordance with the disclosed embodiments.

FIG. 1B illustrates additional aspects of an exemplary first readout stage such as readout stage 105. It will be appreciated that the other readout stages illustrated in FIG. 1A can include similar or identical components.

The readout stage can include a series of output amplifiers that are capacitively connected to a sensor channel via a floating gate sensing node 125. This configuration enables non-destructive charge measurements by each amplifier, while allowing charge to be moved through the output stage without degradation. Thus, the pixel charge can be transferred through the serial register and measured multiple times by multiple amplifiers.

As illustrated in FIG. 1B, the H1 gate 146, H2 gate 148, and gate H3 150 provide the three-clock sequence to move charge along the serial register to the next sense node 125. During normal operation, each amplifier simultaneously measures the charge packets from different pixels, which can be measured once or multiple times in each amplifier. The final pixel value can be calculated by averaging the available samples from each of the amplifiers as illustrated in Equation (1):

$$\text{pixel value} = \frac{1}{N_\alpha}\frac{1}{N_s}\sum_{j=1}^{N_\alpha}\sum_{j=1}^{N_\alpha} s_{j,i} \tag{1}$$

where $S_{j,i}$ is the charge measurement i from the amplifier j, $N_\alpha$ is the number of amplifier channels in the serial register, and $N_s$ is the number of samples taken in each amplifier. Assuming that the readout noise of the amplifiers is similar in standard deviation but independent, the standard deviation of the readout noise in the final pixel value is reduced as shown in equation (2):

$$\sigma = \frac{\sigma_0}{\sqrt{N_s}\sqrt{N_\alpha}} \tag{2}$$

In the fastest readout mode, each amplifier measures the charge only once, and the noise reduction is achieved by combining the single measurements from the different amplifiers.

A disclosed output stage with Na amplifiers, each separated by $d_\alpha$ pixels, can be used to read an active region of $N_{row}$ by $N_{col}$ pixels, where the total readout time is given by Equation (3):

$$T = t_{pix}(N_\alpha(d_\alpha - 1) + d_{ps} + N_{dol})N_{row} \tag{3}$$

where $d_{ps}$ is the number of pixels in the serial register before the first amplifier and $t_{pix}$ is the time to perform each measurement. When the number of pixels in the serial amplifier chain, $N_\alpha(d_\alpha-1)$, is much smaller than $N_{col}$ then the readout time is similar to the readout time of a single output sensor. For example, for an active region of 4 million pixels, the extra readout time needed for eight-amplifiers (or sixteen-amplifiers) each separated by 15 pixels is approximately 5% (or 12%).

Figure 1C:
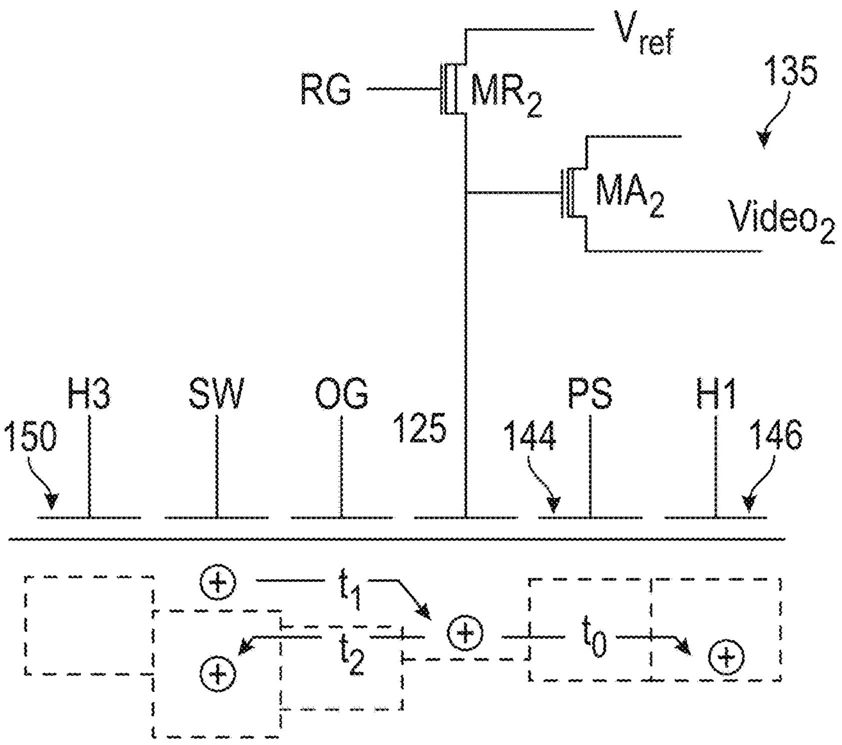
FIG. 1C depicts aspects of an exemplary middle readout stage associated with a system for collecting data from a charge-coupled device, in accordance with the disclosed embodiments.
Figure 1D:
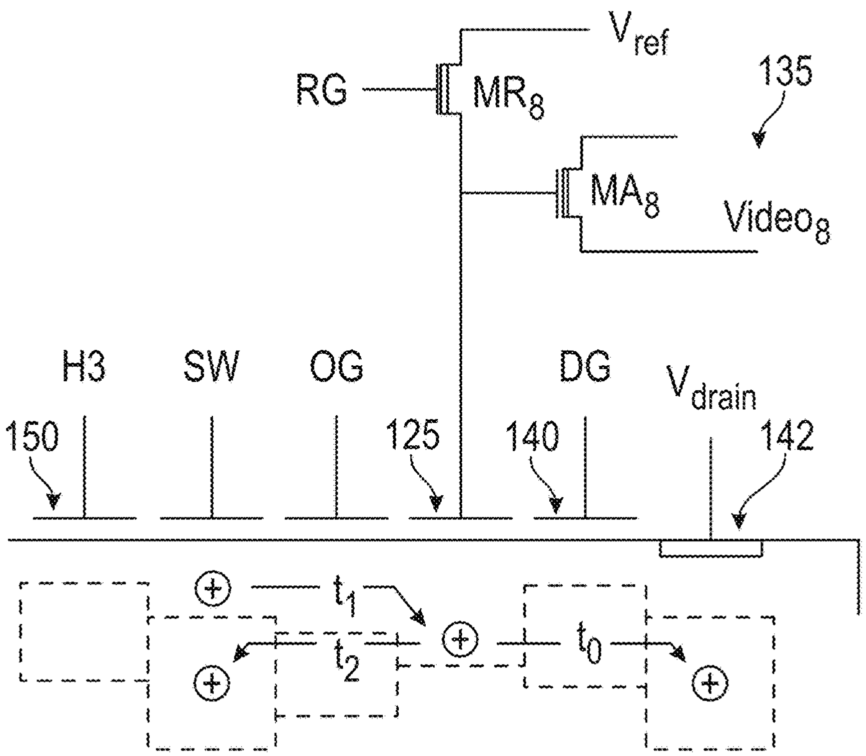
FIG. 1D depicts aspects of an exemplary final readout stage associated with a system for collecting data from a charge-coupled device, in accordance with the disclosed embodiments.

As illustrated in FIG. 1D, the dump gate 140 (DG) and Vdrain 142 of the last stage in the serial register remove the charge from the channel of the serial register after its measurement in the last amplifier. As illustrated in FIG. 1C, the amplifiers use gates PS 144 to facilitate the removal of charge from the sense node to move it to the next amplifier.

Each readout stage measures the charge 120 information of the pixel without corrupting it at the floating gate sensing node 125. The charge 120 can be moved to the next readout stage for a new measurement. At each floating gate sense node 125, the charge 120 information can be read out, with the associated readout assembly. The non-destructive readout capability of each readout stage provides the ability to take more than one measurement of the charge information in each of the output stages if the noise need be reduced further. At the same time, the information from the amplifiers can be used as a differential output to reduce common noise in the chip that adds up in a similar way in the amplifier such as the clocking noise, power supply noise etc.

Figure 2A:
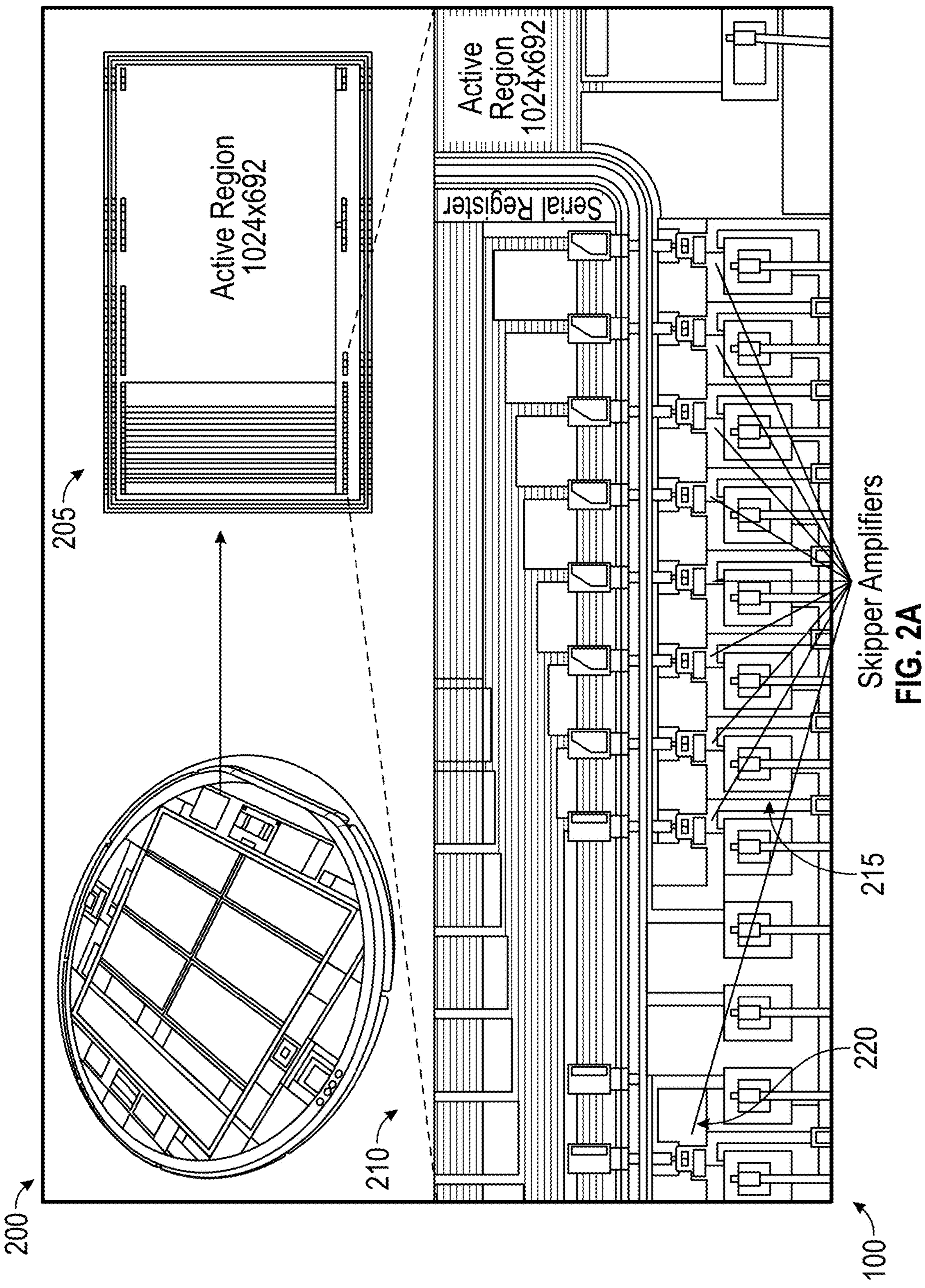
FIG. 2A depicts a charged-couple device sensor array and front end, in accordance with the disclosed embodiments.

FIG. 2A at 210 illustrates a nineth amplifier to the left that is configured to purely sense the common noise among the output stages. This extra amplifier has similar operation as the other amplifiers, but it is not connected to the pixels of the matrix collecting charge.

The final pixel value is obtained as a combination of the information provided by the measurement of all the amplifiers. If the noise contribution in the measurements of the pixels from the output stages are independent and similar in intensity, the final pixel value is calculated as average of the available samples. If the noise in the measurements from the different amplifiers has correlated components or different intensities, a weighted combination of the available samples should be used. Available optimization techniques like the Weiner filter and others can be used to find the optimal weights for combining the available samples. The final computed pixel value has a smaller noise contribution (as compared to using a single stage). At the same time, the readout speed is not detrimental since the readout time for each stage is not increased.

It should be appreciated that system 100 illustrates 8 inline readout stages. However, this is meant to be exemplary and in other embodiments a different number of inline output stages can be used. In principle, there is no limitation on the maximum number of inline non-destructive readout stages, and any non-destructive sensing stage can be used in other embodiments. At the same time, the number of intermediate gates used in this design is meant to be exemplary and in other embodiments a different number of intermediate gates can be used without impacting the noise reduction capability.

FIG. 2A illustrates an exemplary wafer 200. In certain embodiments the wafer 200 can comprise a CCD with aspects of the system 100 including multiple output channels. The active region 205 is illustrated as a 1024×692 array. It should be appreciated that, in other embodiments other array sizes are possible.

FIG. 2A also provides an exploded view 210 of aspects of the system 100 as a part of the active region 205. Specifically, the exploded view 210 illustrates an array 215 8 inline output stages connected to the same serial register, together with a single stage 220 not connected to the sensor that works as a differential output.

Figure 2B:
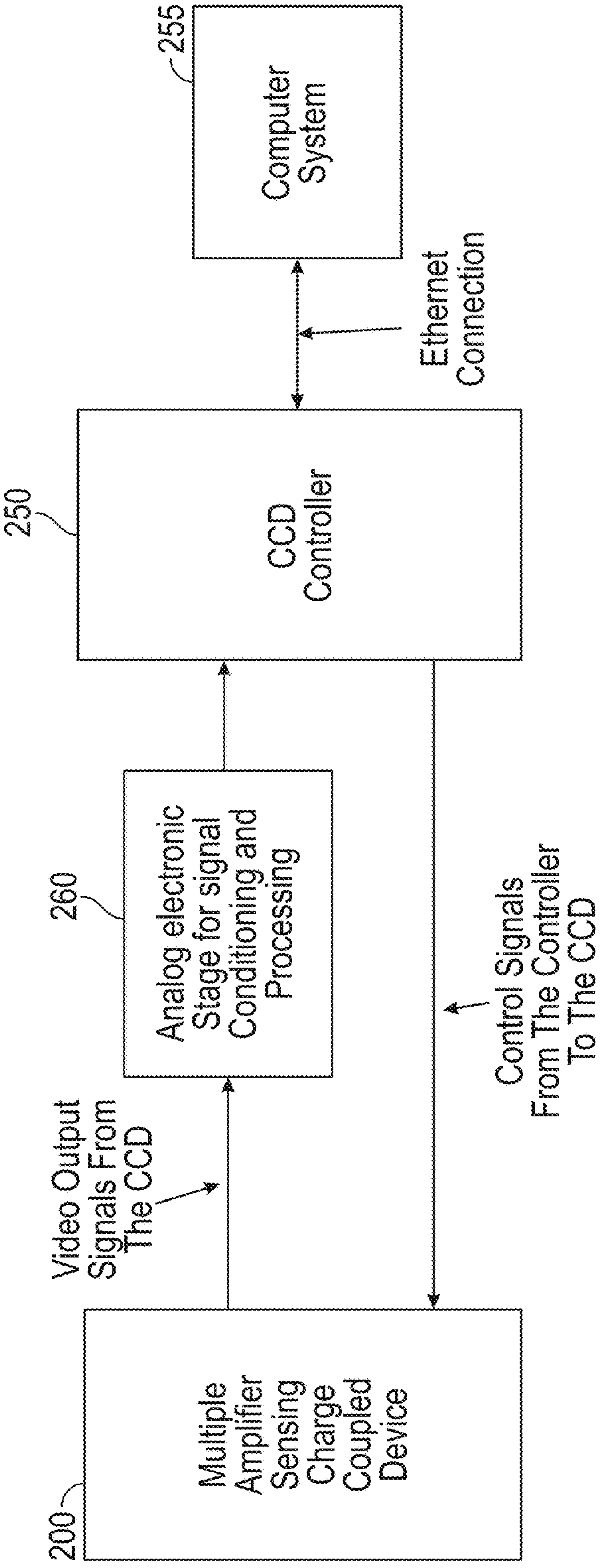
FIG. 2B depicts a block diagram of control system for a charged-couple device, in accordance with the disclosed embodiments.

FIG. 2B illustrates additional aspects of the system in accordance with the disclosed embodiment. As illustrated, the CCD 200 is controlled by a CCD controller 250 which is connected to a computer system 255. Additional details of a computer system which may serve as computer system 255 are provided herein. The controller 250 can send electrical signals to control the CCD 200 and receives the output video signals from the CCD 200. The video signals are conditioned and processed using an analog electronics module 260 before reaching the controller 250.

Figure 3:
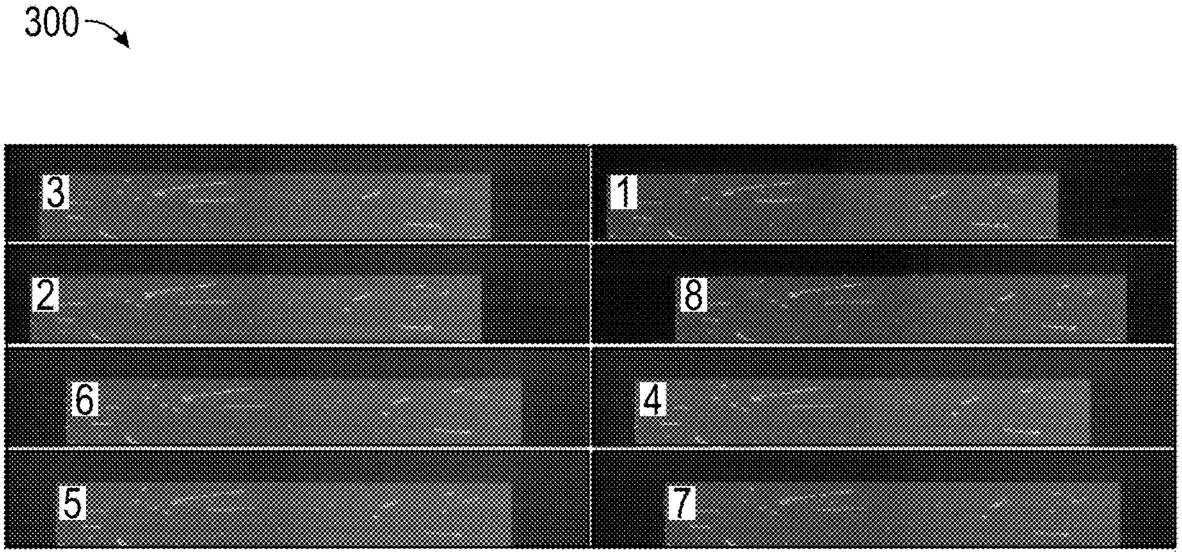
FIG. 3 provides an illustration of images collected using the disclosed systems and methods, in accordance with the disclosed embodiments.

FIG. 3 illustrates an exemplary image 300 taken using the 8 amplifiers as disclosed herein. Each image corresponds to the pixel information measured by each amplifier. The numbering provided at top right of each image indicates the position in the amplifier in the serial register of the CCD output stage. The white area in the center corresponds to pixels in the active region of the sensor when its pixels are exposed to light. The active area also shows ionizing tracks. Since all the amplifiers read the same pixel information, the active region looks similar for all the channels in the figure. This figure visually illustrates the operation and output and of the disclosed systems.

Figure 4:
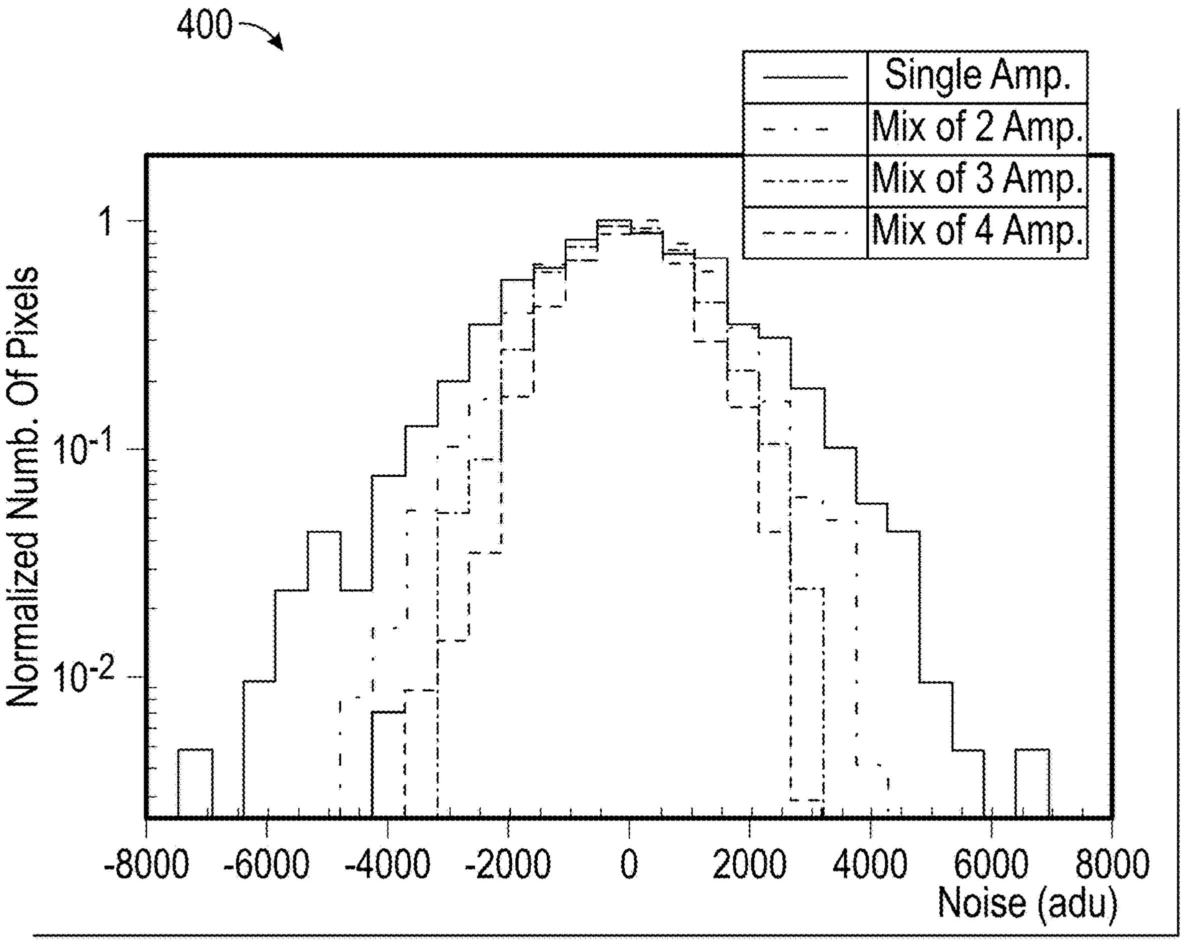
FIG. 4 provides a histogram of noise as a function of number of pixels for mixing with various numbers of amplifiers, in accordance with the disclosed embodiments.

FIG. 4 illustrates a histogram 400 of empty pixels measured using the disclosed methods and systems. The histogram 400 illustrates that the noise (illustrated on the X axis) is reduced as a mix of additional amplifiers as disclosed herein, is used.

Figure 5:
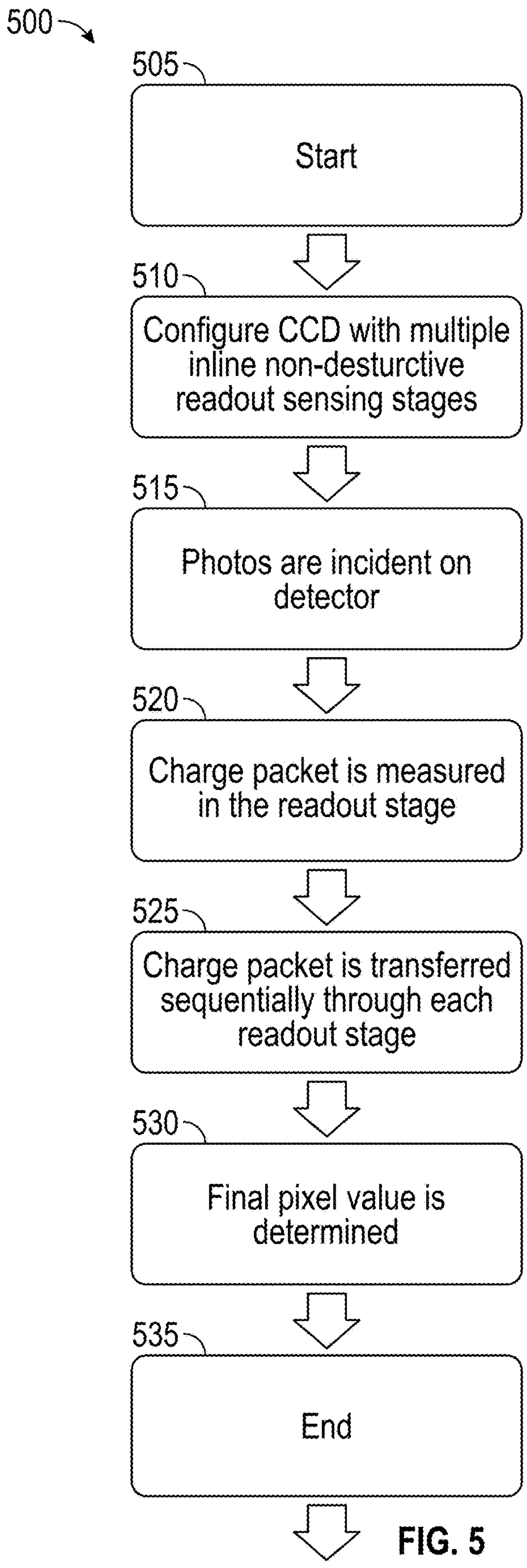
FIG. 5 provides a flow chart of steps associated with a method for reading out data from a charge-coupled device with the systems disclosed herein, in accordance with the disclosed embodiments.

FIG. 5 illustrates a method 500 for improving readout speed for CCDs without sacrificing image quality using the systems disclosed herein. The method begins at 505.

At step 510, a CCD is configured with multiple inline non-destructive readout sensing stages. The number of stages can be selected according to the relative need for quality as compared to readout speed.

Next at step 515 photons are incident on the detector. At step 520 the charge packet is measured in the readout stage it is in. At step 525 the charge packets from the pixels in the detector are transferred sequentially through each readout stage configured as a serial register. The charge measurement in each output stage can be performed using techniques, including but not limited to, Correlated Double Sampling, Dual Side Slope Integrator, Transconductance Amplifiers, Multiple Dual Side Slope Integrator, etc. These techniques can be implemented in an analog or digital way. The pixel value from each stage is then digitized using a standard analog-to-digital converter and the final processing of the pixel value is performed digitally in a dedicated hardware or in an offline processing. The final pixel value is determined according to the measurement value from all of the amplifiers in step 530. The method ends at 535.

Figure 6:
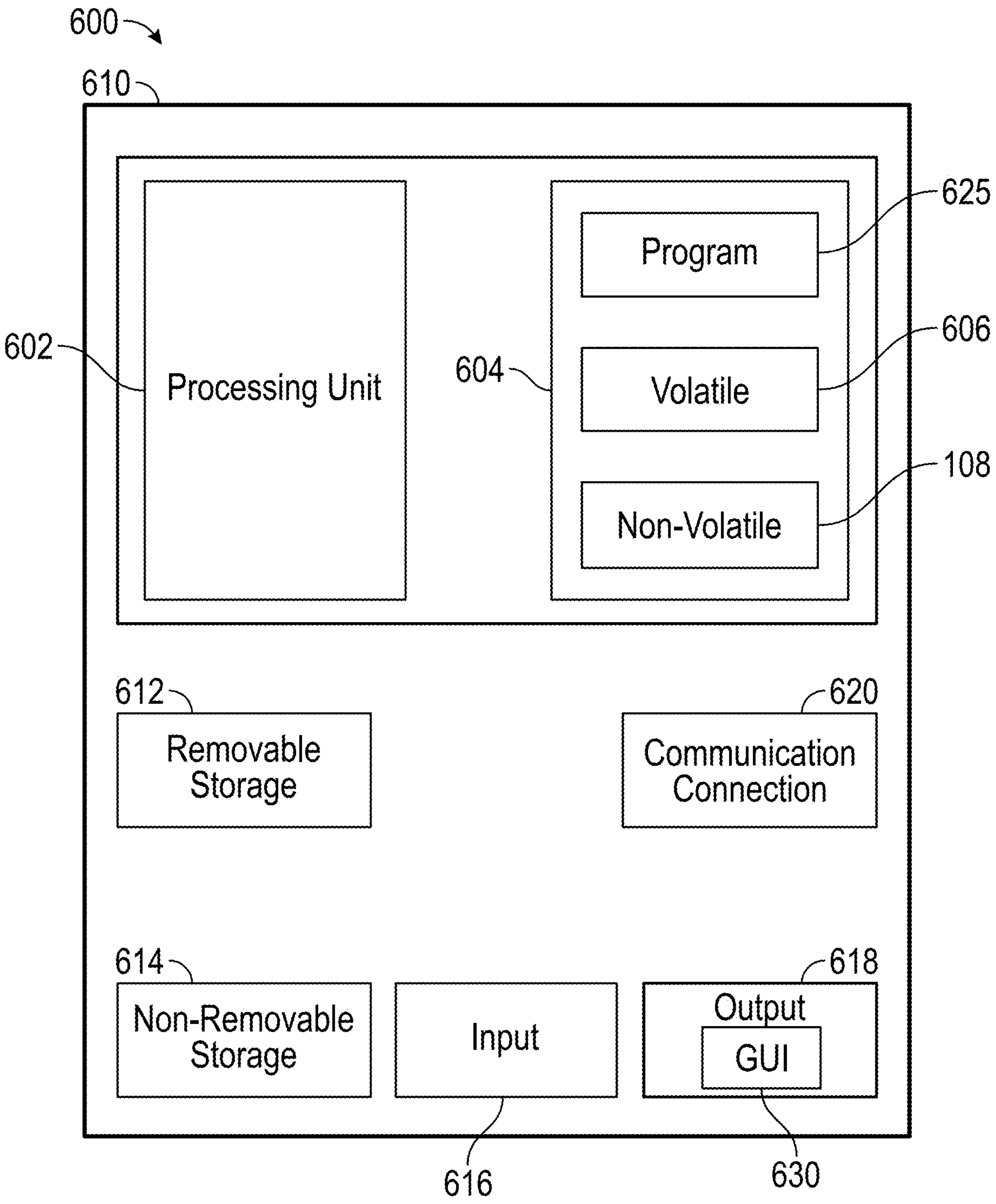
FIG. 6 depicts a block diagram of a computer system which is implemented in accordance with the disclosed embodiments.
Figure 7:
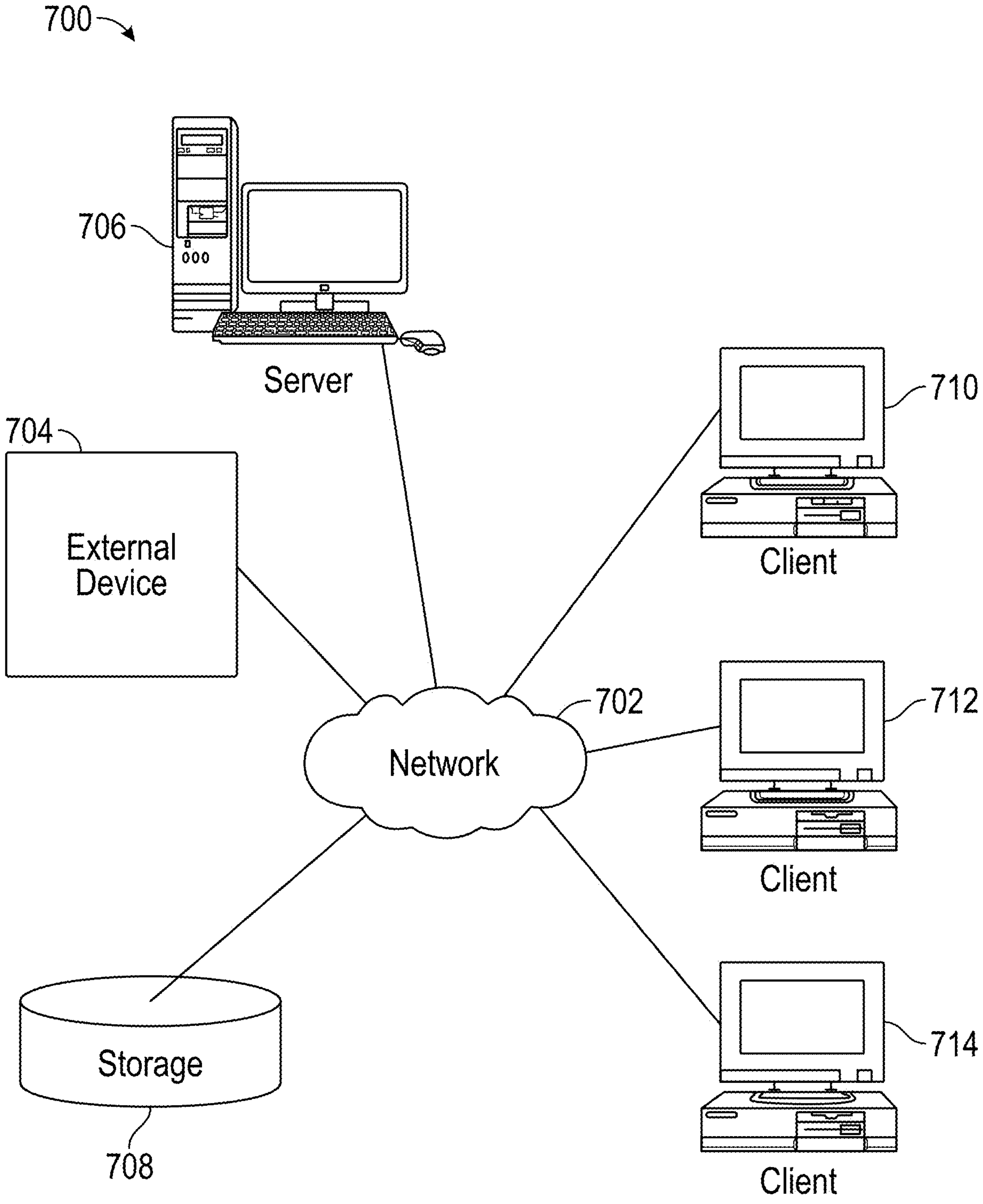
FIG. 7 depicts a graphical representation of a network of data-processing devices in which aspects of the present embodiments may be implemented.
Figure 8:
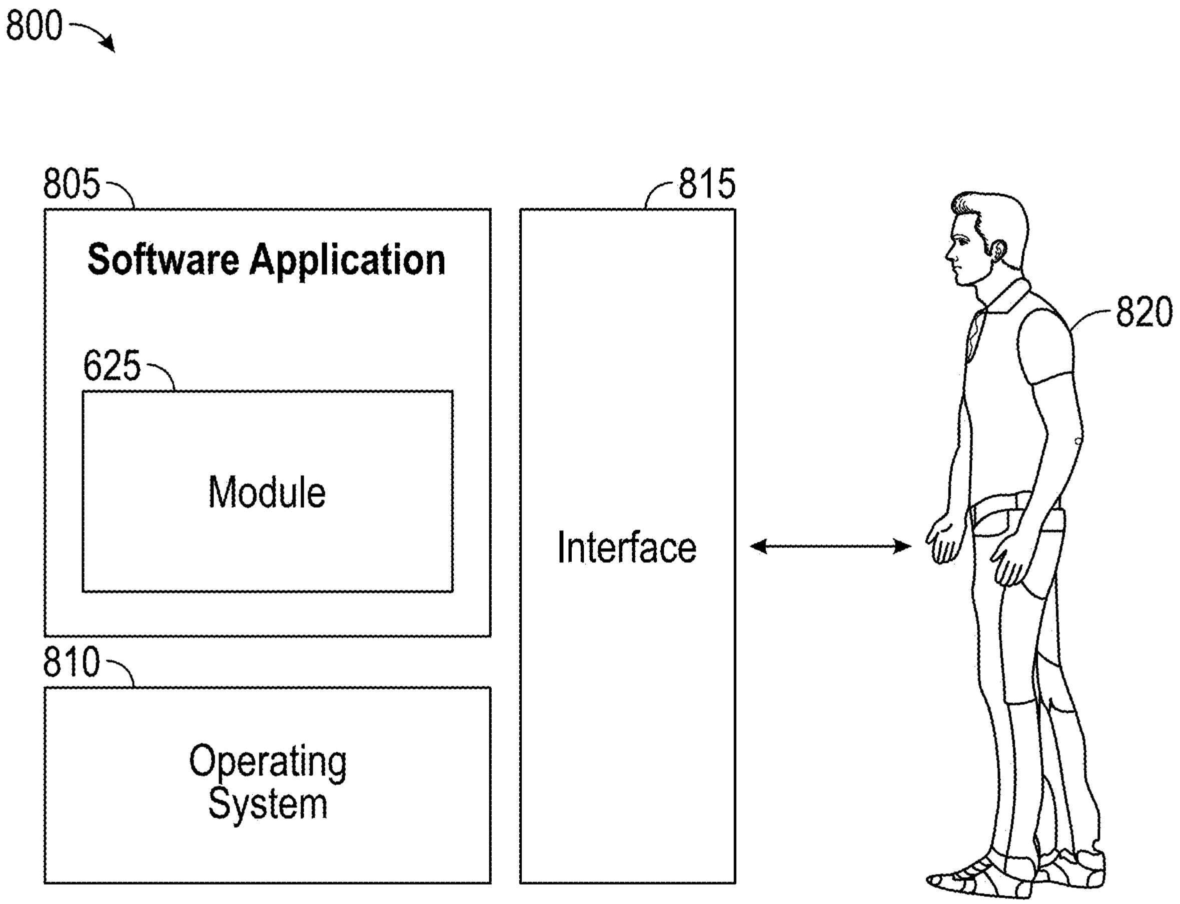
FIG. 8 depicts a computer software system for directing the operation of the data-processing system depicted in FIG. 6, in accordance with an embodiment.

FIGS. 6-8 are provided as exemplary diagrams of data-processing environments in which embodiments of the present invention may be implemented. It should be appreciated that FIGS. 6-8 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

According to the disclosed embodiments, a controller readout system is used to control the operation of the MAS-CCD. The controller provides the electrical signals to collect and move the charge from the carriers and digitize the video signal coming out of the MA amplifier in each readout stage. There is an FPGA in the controller where a Digital Dual Slope Integrator technique is used to calculate the pixel charge information for each measurements in each stage. The output of that processing is a single measurement value for each measurements on each amplifier. Then, that information is transferred to a standard computer using, for example, standard ethernet protocol, wireless communication, or the like. In the computer that information is used to calculate the final pixel value as the combination of the available samples from the different amplifiers.

A block diagram of a computer system 600 that executes programming for implementing parts of the methods and systems disclosed herein is shown in FIG. 6. A computing device in the form of a computer 610 configured to interface with sensors, peripheral devices, and other elements disclosed herein may include one or more processing units 602, memory 604, removable storage 612, and non-removable storage 614. Memory 604 may include volatile memory 606 and non-volatile memory 608. Computer 610 may include or have access to a computing environment that includes a variety of transitory and non-transitory computer-readable media such as volatile memory 606 and non-volatile memory 608, removable storage 612 and non-removable storage 614. Computer storage includes, for example, random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage, or other magnetic storage devices, or any other medium capable of storing computer-readable instructions as well as data including image data.

Computer 610 may include or have access to a computing environment that includes input 616, output 618, and a communication connection 620. The computer may operate in a networked environment using a communication connection 620 to connect to one or more remote computers, remote sensors, detection devices, hand-held devices, multi-function devices (MFDs), mobile devices, tablet devices, mobile phones, Smartphones, or other such devices. The remote computer may also include a personal computer (PC), server, router, network PC, RFID enabled device, a peer device or other common network node, or the like. The communication connection may include a Local Area Network (LAN), a Wide Area Network (WAN), Bluetooth connection, or other networks. This functionality is described more fully in the description associated with FIG. 7 below.

Output 618 is most commonly provided as a computer monitor, but may include any output device. Output 618 and/or input 616 may include a data collection apparatus associated with computer system 600. In addition, input 616, which commonly includes a computer keyboard and/or pointing device such as a computer mouse, computer track pad, or the like, allows a user to select and instruct computer system 600. A user interface can be provided using output 618 and input 616. Output 618 may function as a display for displaying data and information for a user, and for interactively displaying a graphical user interface (GUI) 630.

Note that the term "GUI" generally refers to a type of environment that represents programs, files, options, and so forth by means of graphically displayed icons, menus, and dialog boxes on a computer monitor screen. A user can interact with the GUI to select and activate such options by directly touching the screen and/or pointing and clicking with a user input device 616 such as, for example, a pointing device such as a mouse and/or with a keyboard. A particular item can function in the same manner to the user in all applications because the GUI provides standard software routines (e.g., module 625) to handle these elements and report the user's actions. The GUI can further be used to display the electronic service image frames as discussed below.

Computer-readable instructions, for example, program module or node 625, which can be representative of other modules or nodes described herein, are stored on a computer-readable medium and are executable by the processing unit 602 of computer 610. Program module or node 625 may include a computer application. A hard drive, CD-ROM, RAM, Flash Memory, and a USB drive are just some examples of articles including a computer-readable medium.

FIG. 7 depicts a graphical representation of a network of data-processing systems 700 in which aspects of the present invention may be implemented. Network data-processing system 700 is a network of computers or other such devices such as mobile phones, smartphones, sensors, detection devices, controllers, and the like in which embodiments of the present invention may be implemented. Note that the system 700 can be implemented in the context of a software module such as program module 625. The system 700 includes a network 702 in communication with one or more clients 710, 712, and 714. Network 702 may also be in communication with one or more device 704, servers 706, and storage 708. Network 702 is a medium that can be used to provide communications links between various devices and computers connected together within a networked data processing system such as computer system 600. Network 702 may include connections such as wired communication links, wireless communication links of various types, fiber optic cables, quantum, or quantum encryption, or quantum teleportation networks, etc. Network 702 can communicate with one or more servers 706, one or more external devices such as a controller, actuator, sensor, or other such device 704, and a memory storage unit such as, for example, memory or database 708. It should be understood that device 704 may be embodied as a detector device, CCD front end, CCD, microcontroller, controller, receiver, transceiver, or other such device.

In the depicted example, device 704, server 706, and clients 710, 712, and 714 connect to network 702 along with storage unit 708. Clients 710, 712, and 714 may be, for example, personal computers or network computers, handheld devices, mobile devices, tablet devices, smartphones, personal digital assistants, microcontrollers, recording devices, MFDs, etc. Computer system 600 depicted in FIG. 6 can be, for example, a client such as client 710 and/or 712.

Computer system 600 can also be implemented as a server such as server 706, depending upon design considerations. In the depicted example, server 706 provides data such as boot files, operating system images, applications, and application updates to clients 710, 712, and/or 714. Clients 710, 712, and 714 and external device 704 are clients to server 706 in this example. Network data-processing system 700 may include additional servers, clients, and other devices not shown. Specifically, clients may connect to any member of a network of servers, which provide equivalent content.

In the depicted example, network data-processing system 700 is the Internet with network 702 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, government, educational, and other computer systems that route data and messages. Of course, network data-processing system 700 may also be implemented as a number of different types of networks such as, for example, an intranet, a local area network (LAN), or a wide area network (WAN). FIGS. 6 and 7 are intended as examples and not as architectural limitations for different embodiments of the present invention.

FIG. 8 illustrates a software system 800, which may be employed for directing the operation of the data-processing systems such as computer system 600 depicted in FIG. 6. Software application 805, may be stored in memory 604, on removable storage 612, or on non-removable storage 614 shown in FIG. 6, and generally includes and/or is associated with a kernel or operating system 810 and a shell or interface 815. One or more application programs, such as module(s) or node(s) 625, may be "loaded" (i.e., transferred from removable storage 614 into the memory 604) for execution by the data-processing system 600. The data-processing system 600 can receive user commands and data through user interface 815, which can include input 616 and output 618, accessible by a user 820. These inputs may then be acted upon by the computer system 600 in accordance with instructions from operating system 810 and/or software application 805 and any software module(s) 625 thereof.

Generally, program modules (e.g., module 625) can include, but are not limited to, routines, subroutines, software applications, programs, objects, components, data structures, etc., that perform particular tasks or implement particular abstract data types and instructions. Moreover, those skilled in the art will appreciate that elements of the disclosed methods and systems may be practiced with other computer system configurations such as, for example, handheld devices, mobile phones, smart phones, tablet devices, multi-processor systems, printers, copiers, fax machines, multi-function devices, data networks, microprocessor-based or programmable consumer electronics, networked personal computers, minicomputers, mainframe computers, servers, medical equipment, medical devices, and the like.

Note that the term module or node as utilized herein may refer to a collection of routines and data structures that perform a particular task or implements a particular abstract data type. Modules may be composed of two parts: an interface, which lists the constants, data types, variables, and routines that can be accessed by other modules or routines; and an implementation, which is typically private (accessible only to that module), and which includes source code that actually implements the routines in the module. The term module may also simply refer to an application such as a computer program designed to assist in the performance of a specific task such as word processing, accounting, inventory management, etc., or a hardware component designed to equivalently assist in the performance of a task.

The interface 815 (e.g., a graphical user interface 630) can serve to display results, whereupon a user 820 may supply additional inputs or terminate a particular session. In some embodiments, operating system 810 and GUI 630 can be implemented in the context of a "windows" system. It can be appreciated, of course, that other types of systems are possible. For example, rather than a traditional "windows" system, other operation systems such as, for example, a real time operating system (RTOS) more commonly employed in wireless systems may also be employed with respect to operating system 810 and interface 815. The software application 805 can include, for example, module(s) 625, which can include instructions for carrying out steps or logical operations such as those shown and described herein.

The following description is presented with respect to embodiments of the present invention, which can be embodied in the context of, or require the use of a data-processing system such as computer system 600, in conjunction with program module 625, and data-processing system 700 and network 702 depicted in FIGS. 6-8. The present invention, however, is not limited to any particular application or any particular environment. Instead, those skilled in the art will find that the systems and methods of the present invention may be advantageously applied to a variety of system and application software including database management systems, word processors, and the like. Moreover, the present invention may be embodied on a variety of different platforms including Windows, Macintosh, UNIX, LINUX, Android, Arduino, and the like. Therefore, the descriptions of the exemplary embodiments herein, are for purposes of illustration and not considered a limitation.

Based on the foregoing, it can be appreciated that a number of embodiments, preferred and alternative, are disclosed herein. In an embodiment, a system comprises a front end, and a plurality of readout stages wherein each of the plurality of readout stages are connected creating a serial readout register. In an embodiment, the plurality of readout stages further comprises: a first readout stage comprising a plurality of gates configured to provide a three-clock sequence, a sensing node, and a PS gate configured to remove charge from the sensing node. In an embodiment, the plurality of readout stages further comprises at least one middle readout stage. In an embodiment, the plurality of readout stages further comprises a final readout stage comprising a dump gate and a voltage drain to remove charge from a channel after measurement. In an embodiment, each of the plurality of readout stages is configured to readout charge information. In an embodiment, the plurality of readout stages comprises at least eight readout stages. In an embodiment, the system further comprises a wafer of pixels, wherein each of the pixels is connected to the front end. In an embodiment, the system further comprises at least one readout stage not connected to the plurality of readout stages, wherein the at least one readout stage is configured to provide a differential output. In an embodiment, the final pixel value is determined according to a measurement value from each of the plurality of readout stages.

In another embodiment, a readout method comprises receiving at least one photon on a detector, measuring a charge packet in a first of a plurality of readout stages, transferring the charge packet to a sequential readout stage among the plurality of readout stages, and determining a pixel value associated with the charge packet. In an embodiment of the method, the plurality of readout stages further comprises a first readout stage comprising: a plurality of gates configured to provide a three-clock sequence, a sensing node, and a PS gate configured to remove charge from the sensing node; at least one middle readout stage; and a final readout stage comprising: a dump gate and a voltage drain to remove charge from a channel after measurement. In an embodiment of the method, the plurality of readout stages comprises at least eight readout stages. In an embodiment, the method further comprises connecting each pixel on a wafer of pixels, to a front end associated with the plurality of readout stages. In an embodiment, the method further comprises providing a differential output with at least one readout stage not connected to the plurality of readout stages. In an embodiment the method further comprises, determining the final pixel value according to a measurement value from each of the plurality of readout stages.

In another embodiment, a readout system comprises a plurality of readout stages comprising a first readout stage comprising: a plurality of gates configured to provide a three-clock sequence, a sensing node, and a PS gate configured to remove charge from the sensing node; at least one middle readout stage; and a final readout stage comprising: a dump gate and a voltage drain to remove charge from a channel after measurement. In an embodiment of the readout system, each of the plurality of readout stages is configured to readout charge information from a charge-coupled device. In an embodiment the readout system further comprises a wafer of pixels, connected to a front end associated with the plurality of readout stages. In an embodiment, the readout system further comprises at least one readout stage not connected to the plurality of readout stages, wherein the at least one readout stage is configured to provide a differential output. In an embodiment of the readout system, the final pixel value is determined according to a measurement value from each of the plurality of readout stages.

It should be appreciated that variations of the above-disclosed and other features and functions, or alternatives thereof, may be desirably combined into many other different systems or applications. It should be understood that various presently unforeseen or unanticipated alternatives, modifications, variations, or improvements therein may be subsequently made by those skilled in the art which are also intended to be encompassed by the following claims.

What is claimed is:

1. An image detection system comprising:

a front end; and a plurality of readout stages that are capacitively connected via a floating gate sensing node, wherein each of the plurality of readout stages are connected creating a serial readout register, wherein output of the serial readout register comprises a final pixel value obtained as an average of measurements from all of the plurality of readout stages.

2. The system of claim 1 wherein the plurality of readout stages further comprises:

a first readout stage comprising:

a plurality of gates configured to provide a three-clock sequence;

a sensing node; and a PS gate configured to remove charge from the sensing node.

3. The system of claim 1 wherein the plurality of readout stages further comprises:

at least one middle readout stage.

4. The system of claim 1 wherein the plurality of readout stages further comprises:

a final readout stage comprising:

a dump gate; and a voltage drain to remove charge from a channel after measurement.

5. The system of claim 1 wherein each of the plurality of readout stages is configured to readout charge information.

6. The system of claim 1 wherein the plurality of readout stages comprises at least eight readout stages.

7. The system of claim 1 further comprising:

a wafer of pixels, wherein each of the pixels is connected to the front end.

8. The system of claim 1 further comprising:

at least one readout stage not connected to the plurality of readout stages, wherein the at least one readout stage is configured to provide a differential output from the average of measurements from all of the plurality of readout stages that are capacitively connected.

9. The system of claim 8 wherein a final pixel value is determined according to a measurement value from each of the plurality of readout stages.

10. A readout method for image detection comprising:

receiving at least one photon on a detector;

measuring a charge packet in a first of a plurality of readout stages;

transferring the charge packet to a sequential readout stage among the plurality of readout stages; and determining a pixel value associated with the charge packet, wherein the pixel value comprises an output of the plurality of readout stages comprising an average of measurements from all of the plurality of readout stages.

11. The method of claim 10 wherein the plurality of readout stages further comprises:

a first readout stage comprising:

a plurality of gates configured to provide a three-clock sequence;

a sensing node; and a PS gate configured to remove charge from the sensing node;

at least one middle readout stage; and a final readout stage comprising:

a dump gate; and a voltage drain to remove charge from a channel after measurement.

12. The method of claim 11 wherein the plurality of readout stages comprises at least eight readout stages.

13. The method of claim 10 further comprising:

connecting each pixel on a wafer of pixels, to a front end associated with the plurality of readout stages.

14. The method of claim 10 further comprising:

providing a differential output with at least one readout stage not connected to the plurality of readout stages.

15. The method of claim 14 further comprising:

determining a final pixel value according to a measurement value from each of the plurality of readout stages.

16. An image readout system comprising:

a plurality of readout stages that are capacitively connected via a floating gate sensing node, the plurality of readout stages comprising:

a first readout stage comprising:

a plurality of gates configured to provide a three-clock sequence;

a sensing node; and a PS gate configured to remove charge from the sensing node;

at least one middle readout stage; and a final readout stage comprising:

a dump gate; and a voltage drain to remove charge from a channel after measurement, wherein output from the plurality of readout stages comprises a final pixel value obtained as an average of measurements from all of the plurality of readout stages.

17. The readout system of claim 16 wherein each of the plurality of readout stages is configured to readout charge information from a charge-coupled device.

18. The readout system of claim 16 further comprising:

a wafer of pixels, connected to a front end associated with the plurality of readout stages.

19. The readout system of claim 16 further comprising:

at least one readout stage not connected to the plurality of readout stages, wherein the at least one readout stage is configured to provide a differential output from the average of measurements from all of the plurality of readout stages that are capacitively connected.

20. The readout system of claim 19 wherein a final pixel value is determined according to a measurement value from each of the plurality of readout stages.

* * * * *